US011566524B2

(12) United States Patent
Seidel et al.

(10) Patent No.: US 11,566,524 B2
(45) Date of Patent: Jan. 31, 2023

(54) METHOD AND DEVICE FOR REPAIRING A DAMAGED BLADE TIP OF A TURBINE BLADE WHICH IS ARMOR-PLATED AND PROVIDED WITH A BLADE COATING

(71) Applicant: MTU Aero Engines AG, Munich (DE)

(72) Inventors: Frank Seidel, Grossburgwedel (DE); Nils Weidlich, Neustadt (DE)

(73) Assignee: MTU AERO ENGINES AG, Munich (DE)

( * ) Notice: Subject to any disclaimer, the term of this patent is extended or adjusted under 35 U.S.C. 154(b) by 404 days.

(21) Appl. No.: 15/884,460

(22) Filed: Jan. 31, 2018

(65) Prior Publication Data
US 2018/0216465 A1 Aug. 2, 2018

(30) Foreign Application Priority Data

Feb. 2, 2017 (DE) .......................... 102017201645.0

(51) Int. Cl.
| F01D 5/00 | (2006.01) |
| B23P 6/00 | (2006.01) |
| B23K 15/00 | (2006.01) |
| F01D 11/12 | (2006.01) |
| B23K 31/02 | (2006.01) |
| B23K 26/34 | (2014.01) |
| B23K 26/00 | (2014.01) |
| B23K 9/04 | (2006.01) |
| B23K 31/10 | (2006.01) |
| B23K 10/02 | (2006.01) |
| F01D 5/28 | (2006.01) |
| B23K 101/00 | (2006.01) |

(52) U.S. Cl.
CPC .............. *F01D 5/005* (2013.01); *B23K 9/04* (2013.01); *B23K 10/027* (2013.01); *B23K 15/0086* (2013.01); *B23K 15/0093* (2013.01); *B23K 26/0006* (2013.01); *B23K 26/34* (2013.01); *B23K 31/02* (2013.01); *B23K 31/10* (2013.01); *B23P 6/007* (2013.01); *F01D 11/122* (2013.01); *B23K 2101/001* (2018.08); *F01D 5/288* (2013.01); *F05D 2220/32* (2013.01); *F05D 2230/237* (2013.01); *F05D 2230/238* (2013.01); *F05D 2230/31* (2013.01); *F05D 2230/80* (2013.01); *F05D 2230/90* (2013.01); *F05D 2240/307* (2013.01); *F05D 2300/2282* (2013.01); *F05D 2300/506* (2013.01)

(58) Field of Classification Search
CPC .... B23P 6/007; B23P 6/00; B23P 6/02; B23P 6/045; B22D 19/10; B23K 10/027; B23K 31/10; B23K 9/04; B23K 26/0006; B23K 26/34; B23K 15/0086; B23K 31/02; B23K 15/0093; B23K 2101/001; F05D 2300/506; F05D 2230/237; F05D 2230/31; F05D 2300/2282; F05D 2240/307; F05D 2230/90; F05D 2230/80; F05D 2230/238; F05D 2220/32; F01D 5/288; F01D 5/005; F01D 11/122; Y10T 29/49339; Y10T 29/49337; Y10T 29/49728; Y10T 29/49318; Y10T 29/49341; Y10T 29/49718; Y10T 29/49726; Y10T 29/49732; Y10T 29/49734; Y10T 29/49737; Y10T 29/49742; Y10T 29/49746

See application file for complete search history.

(56) References Cited

U.S. PATENT DOCUMENTS

| 5,794,338 | A | 8/1998 | Bowden, Jr. et al. |
| 5,972,424 | A * | 10/1999 | Draghi .................... B23P 6/007 29/889.1 |
| 6,605,160 | B2 | 8/2003 | Hoskin |
| 7,836,594 | B2 * | 11/2010 | Rose ........................ B23P 6/007 29/402.01 |
| 8,636,890 | B2 | 1/2014 | Woodard et al. |
| 8,807,955 | B2 | 8/2014 | Wrabel et al. |
| 8,996,156 | B2 | 3/2015 | Melzer-Jokisch et al. |
| 9,511,436 | B2 * | 12/2016 | Kumar .................. C04B 35/117 |
| 10,024,161 | B2 * | 7/2018 | McCall .................... F01D 5/20 |
| 2013/0104397 | A1 | 5/2013 | Bunker |
| 2015/0118060 | A1 * | 4/2015 | Kumar .................... F01D 5/005 416/241 R |
| 2015/0132605 | A1 | 5/2015 | Kumar et al. |
| 2016/0230558 | A1 | 8/2016 | McCALL et al. |

FOREIGN PATENT DOCUMENTS

| EP | 0869259 A2 | 10/1998 |
| EP | 2286956 A1 | 2/2011 |
| EP | 2540961 A2 | 1/2013 |
| EP | 2573201 A2 | 3/2013 |
| EP | 2586562 A2 | 5/2013 |
| EP | 3053702 A2 | 8/2016 |

* cited by examiner

Primary Examiner — Sarang Afzali
(74) Attorney, Agent, or Firm — Abel Schillinger, LLP

(57) ABSTRACT

The invention relates to a method for repairing a damaged blade tip of a turbine blade which is armor-plated and provided with a blade coating, of a thermal gas turbine. The method according to the invention comprises the steps of removing a blade tip armor plating of the turbine blade at least in the region of the damaged blade tip and producing a repair surface (12), removing only a part of the blade coating of the turbine blade in the region of the repair surface while preserving a part of the blade coating separated from the repair surface (14), restoring the blade tip reinforcement (20), and restoring the blade coating in the region of the repaired blade tip (22). The invention furthermore relates to a device for carrying out such a method.

20 Claims, 1 Drawing Sheet

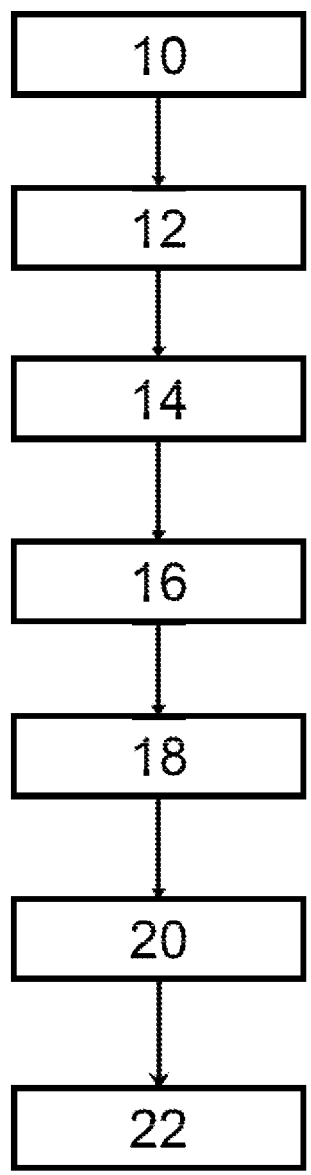

METHOD AND DEVICE FOR REPAIRING A DAMAGED BLADE TIP OF A TURBINE BLADE WHICH IS ARMOR-PLATED AND PROVIDED WITH A BLADE COATING

BACKGROUND OF THE INVENTION

1. Field of the Invention

The invention relates to a method for repairing a damaged blade tip of a turbine blade which is armor-plated and provided with a blade coating, of a thermal gas turbine. The invention furthermore relates to a device for carrying out such a method.

2. Discussion of Background Information

Turbine blades which are armor-plated and provided with a blade coating (so-called HPT blades/high-pressure turbine blades) can generally be repaired only a few times since a loss of wall thickness and strength take place because of the respective material removal when decoating the components. Accordingly, such turbine blades often already need to be scrapped after a few damage events, as they have reached their maximum permissible number of decoatings of the blade body. This leads to high costs. Additional costs occur because the previous methods for component repair of reinforced turbine blades, in particular HPT blades, comprise many expensive process steps.

It is an object of the present invention to provide a method which allows more frequent and more economical repairs of damaged blade tips of reinforced turbine blades provided with a blade coating. Another object of the invention is to provide an apparatus for carrying out such a method.

SUMMARY OF THE INVENTION

A first aspect of the invention relates to a method for repairing a damaged blade tip of a turbine blade which is armor-plated and provided with a blade coating, of a thermal gas turbine. The method according to the invention comprises the steps of removing a blade tip armor-coating of the turbine blade at least in the region of the damaged blade tip and producing a repair surface, removing only a part of the blade coating of the turbine blade in the region of the repair surface while preserving a part of the blade coating separated from the repair surface, restoring the blade tip armor-plating, and restoring the blade coating in the region of the repaired blade tip. With the aid of the method according to the invention, damaged blade tips of armor-plated and coated turbine blades can be repaired rapidly and reliably with a few steps that can be carried out economically. In contrast to the prior art, a plurality of steps and in particular full decoating and subsequent full recoating of the turbine blades can be obviated, so that time and costs can be saved to a significant extent. Since furthermore only a small part of the blade coating, which is also referred to as the airfoil coating, in the vicinity of the repair surface is removed, the repair of the reinforced blade tip does not entail a loss of wall thickness and strength of the blade body, so that the number of repairs possible and therefore the lifetime of the turbine blade are increased significantly, which leads to further significant time and cost savings. A further advantage consists in an improved running time behavior of the locally repaired turbine blade because of the repair carried out relatively nonaggressively. In general, "a"/"an" in the context of this disclosure is to be understood as an indefinite article, i.e. without explicit indication to the contrary always also as "at least one".

According to one advantageous configuration of the invention, repair material is applied onto the repair surface and a target contour of the blade tip is restored. In this way, the initial geometry of the turbine blade can be fully restored.

According to another advantageous configuration of the invention, the blade tip armor-plating and/or the blade coating is at least partially removed by means of a separating method. In this way, the blade tip armor-plating may be removed partially or fully as a function of the respective pattern of damage. In particular, machining manufacturing methods such as grinding are suitable as separating methods. The blade coating in the region of the blade tip may likewise be removed by means of a separating method, in order to prepare the turbine blade for the subsequent application of repair material.

Further advantages are achieved if the repair material is applied onto the repair surface by means of a welding method, in particular by deposit welding, and/or by an additive manufacturing method. In this way, construction of the initial original or target contour of the blade tip is possible with little mixing and a small thermal effect zone, so that the initial shape and load-bearing capacity of the turbine blade are reliably restored. In one configuration, the original or target contour of the blade tip can be restored merely by the step of controlled application of repair material.

According to another advantageous configuration of the invention, the blade coating is removed only as far as a distance of at most 15%, that is to say at most 1%, 2%, 3%, 4%, 5%, 6%, 7%, 8%, 9%, 10%, 11%, 12%, 13%, 14% or 15%, of the height of the blade body from the repair surface. In this way, an unnecessary loss of wall thickness and strength of the blade body is prevented, so that the number of repairs possible and therefore the lifetime of the turbine blade are increased significantly.

According to another advantageous configuration of the invention, the target contour of the blade tip is restored by means of a separating method after application of the repair material. This is advantageous in particular when the repair material has initially been applied with an excess relative to the original or target contour of the blade tip, and is subsequently restored by removing excess repair material. In this case as well, machining manufacturing methods such as grinding are suitable as separating methods.

Further advantages are achieved if the blade tip armor-plating is restored by means of a joining method, in particular by soldering. This allows a material-fit, and therefore particularly highly loadable, connection between the blade tip of the turbine blade and the blade tip armor plating. In particular by the use of a soldering method, surface alloying can advantageously be produced between the blade material, or repair material, and the material of the blade tip armor plating, without melting the turbine blade in depth. Provision may be made to restore the blade tip armor plating by producing and/or applying a particle composite material having embedded hard material particles, in particular of cubic boron nitrite (CBN), onto the blade tip. In this way, a blade tip armor plating which is particularly strong thermally, chemically and mechanically can be produced. For example, hard material particles composed of cubic boron nitrite (CBN), which are optionally also coated with an active element, may be applied. For better adhesion, the hard material particles may be embedded in an enclosing matrix, for example of a solder material, so that a particularly stable connection of the hard material particles to the blade tip is achieved. The particle composite may be produced directly on the turbine blade, or initially produced separately therefrom, applied onto the turbine blade and connected thereto.

Further advantages are achieved if the blade coating is restored by means of a coating method, in particular by diffusion coating. In this way, the previously removed part of the blade coating can be restored locally and produced with particularly high hot-gas corrosion and oxidation protection. Various methods may be used for the restoration of the blade coating, preferably touch-up slurry coating methods, chemical deposition or diffusion from the vapor phase (CVD methods), powder pack coating methods or the like.

A second aspect of the invention relates to a device for carrying out a method according to the first aspect of the invention. To this end, the device according to the invention comprises a first separating device, which is configured to remove a blade tip armor plating of the turbine blade at least in the region of the damaged blade tip and to produce a repair surface, a second separating device, which is configured to remove only a part of the blade coating of the turbine blade in the region of the repair surface while preserving a part of the blade coating separated from the repair surface, a first repair device, which is configured to restore the blade tip armor plating, and a second repair device, which is configured to restore the blade coating in the region of the repaired blade tip. With the aid of the device according to the invention, damaged blade tips of armor plated and coated turbine blades can be repaired quickly and reliably. In contrast to the prior art, a plurality of steps and in particular full decoating and subsequent full recoating of the turbine blades can be obviated, so that time and costs can be saved to a significant extent. Since furthermore only a small part of the blade coating, which is also referred to as the airfoil coating, in the vicinity of the repair surface is to be removed, the repair of the armor-plated blade tip does not entail a loss of wall thickness and strength of the blade body, so that the number of repairs possible and therefore the lifetime of the turbine blade are increased significantly, which leads to further significant time and cost savings. A further advantage consists in an improved running time behavior of the locally repaired turbine blade because of the repair carried out relatively nonaggressively. In this case, provision may in principle be made that two or more separating and/or repair devices are configured in an integrated fashion, so that the relevant integrated separating/repair device is configured to carry out two or more of the method steps mentioned. In the scope of the present disclosure, the term "configured to" is generally intended to mean devices which not only have a suitability in principle for the relevant treatment, but which are configured specifically on the basis of hardware and/or software so that they also actually carry out the relevant treatment. The apparatus may in principle comprise a control device, by means of which the individual separating and/or repair devices are to be controlled and/or regulated. To this end, the control device comprises a processor device, which is configured to carry out an embodiment of the method according to the invention. The processor device may to this end comprise at least one microprocessor and/or at least one microcontroller. The processor device may furthermore comprise program code which is configured to carry out the embodiment of the method according to the invention when run by the processor device. The program code may be stored in a data memory of the processor device. Further features and advantages thereof may be found in the descriptions of the first aspect of the invention, advantageous configurations of the first aspect of the invention being intended to be regarded as advantageous configurations of the second aspect of the invention, and vice versa.

In one advantageous configuration of the invention, the device comprises a third repair device, which is configured to apply repair material onto the repair surface and to restore a target contour of the blade tip. In this way, the initial geometry of the turbine blade—for example as a function of the pattern of damage and the required final geometry—may be fully restored if necessary.

Further features of the invention may be found in the claims, the FIGURE and the description of the FIGURE. The features and feature combinations mentioned above in the description, as well as the features and feature combinations mentioned below in the description of the FIGURE and/or merely shown in the FIGURE, may be used not only in the combination respectively indicated, but also in other combinations, without departing from the scope of the invention. Embodiments of the invention which are not explicitly shown and explained in the FIGURE but derive and may be produced by separate feature combinations from the embodiments explained, are therefore also to be regarded as included. Embodiments and feature combinations which do not therefore contain all features of an originally formulated independent claim are also to be regarded as disclosed. Embodiments and feature combinations which extend beyond or differ from feature combinations presented in the back-references of the claims are furthermore intended to be regarded as disclosed, in particular by the embodiments explained above.

BRIEF DESCRIPTION OF THE DRAWING

The single FIGURE shows a flow chart of a method according to the invention for repairing a damaged blade tip of an armor-plated turbine blade provided with a blade coating.

DETAILED DESCRIPTION OF EMBODIMENTS OF THE INVENTION

The single FIGURE shows a flow chart of a method according to the invention for repairing a damaged blade tip of an armor-plated turbine blade provided with a blade coating, for example of a high-pressure turbine blade (HPT blade). In a first step 10, the damaged turbine blade is provided and prepared for the repair. To this end, in step 12 the blade tip armor plating of the turbine blade is removed at least in the region of the damaged blade tip, and a repair surface is produced. This may for example be done by a machining operation, for instance grinding. In step 14, the blade coating (airfoil coating) of the turbine blade is removed only in the region of the repair surface while preserving a part of the blade coating separated from the repair surface, in order to prepare the turbine blade for subsequent welding (step 16). This step may also, for example, be carried out by a machining operation. The repair method therefore obviates full decoating of the turbine blade, and therefore does not lead to a loss of wall thickness and strength, particularly of the blade body which is heavily loaded during operation. The repair is therefore substantially less aggressive for the component and can readily be carried out several times on the same turbine blade without problems.

In the following step 16, repair material is applied onto the repair surface by deposit welding, and in an in principle optional step 18, is recontoured by machining (for example by grinding) in order to restore an original or target contour of the blade tip. If the desired contour of the blade tip has already been produced in step 16, step 18 is not necessary. If the pattern of damage in a specific case does not require reconstruction with repair material, step 16 may also in general be omitted.

In step 20, the blade tip armor plating is then restored by a step preferably likewise acting only locally on the turbine blade, for example by local soldering. The blade tip armor plating may, for example, be produced from cubic boron nitrite (CBN) which is embedded in a matrix.

In order to conclude the repair, in step 22, by locally limited touch-up diffusion coating, the blade coating, and therefore the protection of the turbine blade against thermal and chemical influences, is restored in the region of the repaired blade tip.

With the procedure proposed, several steps may be obviated, in particular full decoating and subsequent recoating of the blade body, so that time and costs can be saved to a significant extent. Besides reducing the scrappage rate of reinforced turbine blades, in particular HPT blades, and the very high cost savings associated with this, an improved running time behavior of the only locally repaired turbine blade is also achieved because of a repair carried out relatively nonaggressively, in combination with relatively low repair costs.

The parameter values indicated in the documents in order to define process conditions and measurement conditions for the characterization of specific properties of the subject matter of the invention are also intended to be regarded as included by the scope of the invention even in the context of deviations—for example due to measurement errors, system errors, weigh-in errors, DIN tolerances and the like.

LIST OF REFERENCE NUMERALS

10 provision of a damaged turbine blade
12 removal of a blade tip armor plating of the turbine blade and production of a repair surface
14 removal of a blade coating of the turbine blade only in the region of the repair surface while preserving a part of the blade coating separated from the repair surface
16 application of repair material onto the repair surface
18 recontouring of the repair material
20 restoration of the blade tip reinforcement
22 restoration of the blade coating

What is claimed is:

1. A method for repairing a damaged blade tip of a turbine blade of a thermal gas turbine, which blade is provided with an airfoil coating and with a blade tip armor plating, wherein the method comprises:
   removing the blade tip armor plating of the turbine blade at least in a region of the damaged blade tip and producing a repair surface;
   removing only a part of the airfoil coating of the turbine blade in a region of the repair surface while preserving a part of the airfoil coating separated from the repair surface;
   repairing the damaged blade tip;
   restoring the blade tip armor plating; and
   restoring the airfoil coating in the region of the repair surface.

2. The method of claim 1, wherein before restoration of the blade tip armor plating repair material is applied onto the repair surface and a target contour of the blade tip is restored.

3. The method of claim 2, wherein the target contour of the blade tip is restored by a separating method after application of the repair material.

4. The method of claim 1, wherein a repair material is applied onto the repair surface by a welding method.

5. The method of claim 4, wherein the welding method comprises deposit welding.

6. The method of claim 1, wherein the blade tip armor plating is restored by a joining method.

7. The method of claim 6, wherein the joining method comprises soldering.

8. The method of claim 1, wherein the blade tip armor plating is restored by producing and/or applying a particle composite material having embedded hard material particles onto the blade tip.

9. The method of claim 8, wherein the hard material particles comprise cubic boron nitride (CBN).

10. The method of claim 1, wherein the airfoil coating is restored by a coating method.

11. The method of claim 10, wherein the coating method comprises diffusion coating.

12. The method of claim 1, wherein the blade tip armor plating and/or the airfoil coating is at least partially removed by a separating method.

13. The method of claim 1, wherein a repair material is applied onto the repair surface by an additive manufacturing method.

14. The method of claim 1, wherein a distance between the preserved part of the airfoil coating and the repair surface is not greater than 15% of a height of the blade body.

15. The method of claim 1, wherein a distance between the preserved part of the airfoil coating and the repair surface is not greater than 12% of a height of the blade body.

16. The method of claim 1, wherein a distance between the preserved part of the airfoil coating and the repair surface is not greater than 10% of a height of the blade body.

17. The method of claim 1, wherein a distance between the preserved part of the airfoil coating and the repair surface is not greater than 7% of a height of the blade body.

18. The method of claim 1, wherein a distance between the preserved part of the airfoil coating and the repair surface is not greater than 5% of a height of the blade body.

19. The method of claim 1, wherein a distance between the preserved part of the airfoil coating and the repair surface is not greater than 4% of a height of the blade body.

20. The method of claim 1, wherein a distance between the preserved part of the airfoil coating and the repair surface is not greater than 3% of a height of the blade body.

* * * * *